(12) United States Patent
Narimatsu et al.

(10) Patent No.: US 11,906,288 B2
(45) Date of Patent: Feb. 20, 2024

(54) THREE-DIMENSIONAL SHAPE MEASURING METHOD AND THREE-DIMENSIONAL SHAPE MEASURING DEVICE

(71) Applicant: Seiko Epson Corporation, Tokyo (JP)

(72) Inventors: Shuji Narimatsu, Hokuto (JP);
Hirosada Horiguchi, Minowa (JP);
Hiroshi Hasegawa, Chino (JP)

(73) Assignee: SEIKO EPSON CORPORATION (JP)

( * ) Notice: Subject to any disclaimer, the term of this patent is extended or adjusted under 35 U.S.C. 154(b) by 331 days.

(21) Appl. No.: 17/475,387

(22) Filed: Sep. 15, 2021

(65) Prior Publication Data

US 2022/0082373 A1 Mar. 17, 2022

(30) Foreign Application Priority Data

Sep. 16, 2020 (JP) ................................. 2020-155381

(51) Int. Cl.
| | |
|---|---|
| *G01B 11/06* | (2006.01) |
| *G01B 11/25* | (2006.01) |
| *G06T 7/521* | (2017.01) |
| *G06T 7/60* | (2017.01) |
| *G06T 7/73* | (2017.01) |

(52) U.S. Cl.
CPC ...... *G01B 11/2513* (2013.01); *G01B 11/0608* (2013.01); *G06T 7/521* (2017.01); *G06T 7/60* (2013.01); *G06T 7/73* (2017.01); *G06T 2207/10024* (2013.01)

(58) Field of Classification Search
CPC ............ G01B 11/2513; G01B 11/0608; G01B 11/002; G01B 11/2509; G06T 7/521; G06T 7/60; G06T 7/73; G06T 2207/10024; H04N 23/13
USPC .......................... 356/636, 601–605, 610–625
See application file for complete search history.

(56) References Cited

U.S. PATENT DOCUMENTS

| | | | | |
|---|---|---|---|---|
| 4,802,759 | A | * | 2/1989 | Matsumoto ........ G01B 11/2513 702/167 |
| 6,252,623 | B1 | * | 6/2001 | Lu ........................... G01B 11/25 348/42 |

(Continued)

FOREIGN PATENT DOCUMENTS

| | | |
|---|---|---|
| CN | 105372259 A | 3/2016 |
| JP | H09-21620 A | 1/1997 |

(Continued)

*Primary Examiner* — Isiaka O Akanbi
(74) *Attorney, Agent, or Firm* — Harness, Dickey & Pierce, P.L.C.

(57) ABSTRACT

A three-dimensional shape measuring method includes: projecting a first grid pattern based on a first light and a first full pattern based on a second light onto a target object, the first light and the second light being lights of two colors included in three primary colors of light; picking up, by a three-color camera, an image of the first grid pattern and the first full pattern projected on the target object, and acquiring a first picked-up image based on the first light and a second picked-up image based on the second light; and calculating height information of the target object, using the first picked-up image, and calculating position information of the target object, using the second picked-up image.

8 Claims, 10 Drawing Sheets

(56) References Cited

U.S. PATENT DOCUMENTS

| | | | | |
|---|---|---|---|---|
| 2002/0075456 | A1* | 6/2002 | Shiratani | G01B 11/2513 |
| | | | | 353/31 |
| 2003/0016366 | A1* | 1/2003 | Takeda | G01B 11/2513 |
| | | | | 356/604 |
| 2003/0026475 | A1* | 2/2003 | Yahashi | G01B 11/2509 |
| | | | | 382/285 |
| 2004/0126006 | A1* | 7/2004 | Chang | G01B 11/25 |
| | | | | 382/154 |
| 2009/0046301 | A1* | 2/2009 | Asakura | G01J 3/02 |
| | | | | 356/610 |
| 2012/0229816 | A1* | 9/2012 | Rodrigue | G01B 11/25 |
| | | | | 356/610 |
| 2016/0309135 | A1* | 10/2016 | Ovsiannikov | G06T 7/521 |
| 2017/0134710 | A1* | 5/2017 | Wang | H04N 13/261 |
| 2017/0277028 | A1* | 9/2017 | Short | G06T 7/521 |
| 2018/0128602 | A1 | 5/2018 | Morimoto et al. | |
| 2019/0355138 | A1* | 11/2019 | Hall | H04N 13/239 |
| 2020/0139553 | A1* | 5/2020 | Diankov | B25J 9/1697 |

FOREIGN PATENT DOCUMENTS

| | | | |
|---|---|---|---|
| JP | 2001-147110 | A | 5/2001 |
| JP | 2006-300929 | A | 11/2006 |
| JP | 2016-011857 | A | 1/2016 |
| JP | 6590339 | B2 | 10/2019 |

\* cited by examiner

FIG. 6

| | | COMBINATION EXAMPLE 1 | COMBINATION EXAMPLE 2 | COMBINATION EXAMPLE 3 | COMBINATION EXAMPLE 4 |
|---|---|---|---|---|---|
| | OBJECT COLOR | RED | BLUE | GREEN | WHITE |
| COLOR OF PROJECTED PATTERN | FIRST GRID PATTERN (FIRST LIGHT) | R ~51 | B ~51 | G ~51 | G ~51 |
| | SECOND GRID PATTERN (THIRD LIGHT) | | | | |
| | FIRST FULL PATTERN (SECOND LIGHT) | G ~53 | G ~53 | B ~53 | R ~53 |
| | SECOND FULL PATTERN (THIRD LIGHT) | | | | |

FIG. 8

| | | COMBINATION EXAMPLE 5 | COMBINATION EXAMPLE 6 | COMBINATION EXAMPLE 7 | COMBINATION EXAMPLE 8 |
|---|---|---|---|---|---|
| | OBJECT COLOR | RED | BLUE | GREEN | WHITE |
| COLOR OF PROJECTED PATTERN | FIRST GRID PATTERN (FIRST LIGHT) | R ~51 | B ~51 | G ~51 | G ~51 |
| | SECOND GRID PATTERN (THIRD LIGHT) | B ~52 | R ~52 | R ~52 | B ~52 |
| | FIRST FULL PATTERN (SECOND LIGHT) | G ~53 | G ~53 | B ~53 | R ~53 |
| | SECOND FULL PATTERN (THIRD LIGHT) | | | | |

FIG. 10

| | COMBINATION EXAMPLE 9 | COMBINATION EXAMPLE 10 | COMBINATION EXAMPLE 11 | COMBINATION EXAMPLE 12 |
|---|---|---|---|---|
| OBJECT COLOR | RED | BLUE | GREEN | WHITE |
| COLOR OF PROJECTED PATTERN — FIRST GRID PATTERN (FIRST LIGHT) | R /-51 | B /-51 | G /-51 | G /-51 |
| SECOND GRID PATTERN (THIRD LIGHT) | | | | |
| FIRST FULL PATTERN (SECOND LIGHT) | G /-53 | G /-53 | B /-53 | R /-53 |
| SECOND FULL PATTERN (THIRD LIGHT) | B /-54 | R /-54 | R /-54 | B /-54 |

THREE-DIMENSIONAL SHAPE MEASURING METHOD AND THREE-DIMENSIONAL SHAPE MEASURING DEVICE

The present application is based on, and claims priority from JP Application Serial Number 2020-155381, filed Sep. 16, 2020, the disclosure of which is hereby incorporated by reference herein in its entirety.

BACKGROUND

1. Technical Field

The present disclosure relates to a three-dimensional shape measuring method and a three-dimensional shape measuring device.

2. Related Art

As a method for measuring a three-dimensional surface shape of an object, a grid projection method using an optical technique is known.

JP-A-9-21620 discloses a three-dimensional shape measuring method including: projecting pattern lights based on a plurality of sinusoidal slit pattern data having different frequency components and different color components; separating a resulting deformed grid image for each color component and calculating a shape of an object, based on the deformed grid image corresponding to each color component; and integrating results of the calculation.

In this method, since pattern lights having different color components, for example, RGB, and having different frequency components, are projected, information resulting from picking up an image of the pattern lights having the different frequency components can be acquired at a time. Therefore, this method is effective in that the three-dimensional shape of an object can be measured accurately and at high speed.

In the method described in JP-A-9-21620, a grid image acquired by picking up an image of pattern lights is analyzed to find the three-dimensional shape of an object. As this analysis method, a fringe scanning method, a phase shift method, a Fourier transform method, a scanning Moiré method, and a phase-shift digital Moiré method are described in JP-A-9-21620.

In the method described in JP-A-9-21620, the three-dimensional shape is found by analyzing one grid image, using pattern lights having different color components. Therefore, measurement can be performed in a short time and with high accuracy.

However, the method of analyzing a grid image has a problem in that the accuracy of position information is low, though height information can be found with high accuracy. Therefore, in order to measure the three-dimensional shape more accurately and at high speed, a method for measuring both the height and the position of an object in a short time is demanded.

SUMMARY

A three-dimensional shape measuring method according to an application example of the present disclosure includes: projecting a first grid pattern based on a first light and a first full pattern based on a second light onto a target object, the first light and the second light being lights of two colors included in three primary colors of light; picking up, by a three-color camera, an image of the first grid pattern and the first full pattern projected on the target object, and acquiring a first picked-up image based on the first light and a second picked-up image based on the second light; and calculating height information of the target object, using the first picked-up image, and calculating position information of the target object, using the second picked-up image.

A three-dimensional shape measuring device according to another application example of the present disclosure includes: a projector projecting a first grid pattern based on a first light and a first full pattern based on a second light onto a target object, the first light and the second light being lights of two colors included in three primary colors of light; a three-color camera picking up an image of the first grid pattern and the first full pattern projected on the target object and acquiring a first picked-up image based on the first light and a second picked-up image based on the second light; and a computing unit calculating height information of the target object, using the first picked-up image, and calculating position information of the target object, using the second picked-up image.

BRIEF DESCRIPTION OF THE DRAWINGS

FIG. 6 is a table showing a combination example of an object color and RGB allocated to a first light, a second light, and a third light in the first embodiment.

FIG. 8 is a table showing a combination example of an object color and RGB allocated to a first light, a second light, and a third light in the second embodiment.

FIG. 10 is a table showing a combination example of an object color and RGB allocated to a first light, a second light, and a third light in the third embodiment.

DESCRIPTION OF EXEMPLARY EMBODIMENTS

The three-dimensional shape measuring method and the three-dimensional shape measuring device according to the present disclosure will now be described in detail, based on embodiments shown in the accompanying drawings.

1. First Embodiment

First, a three-dimensional shape measuring method and a three-dimensional shape measuring device according to a first embodiment will be described.

1.1. Configuration of Device

Figure 1:
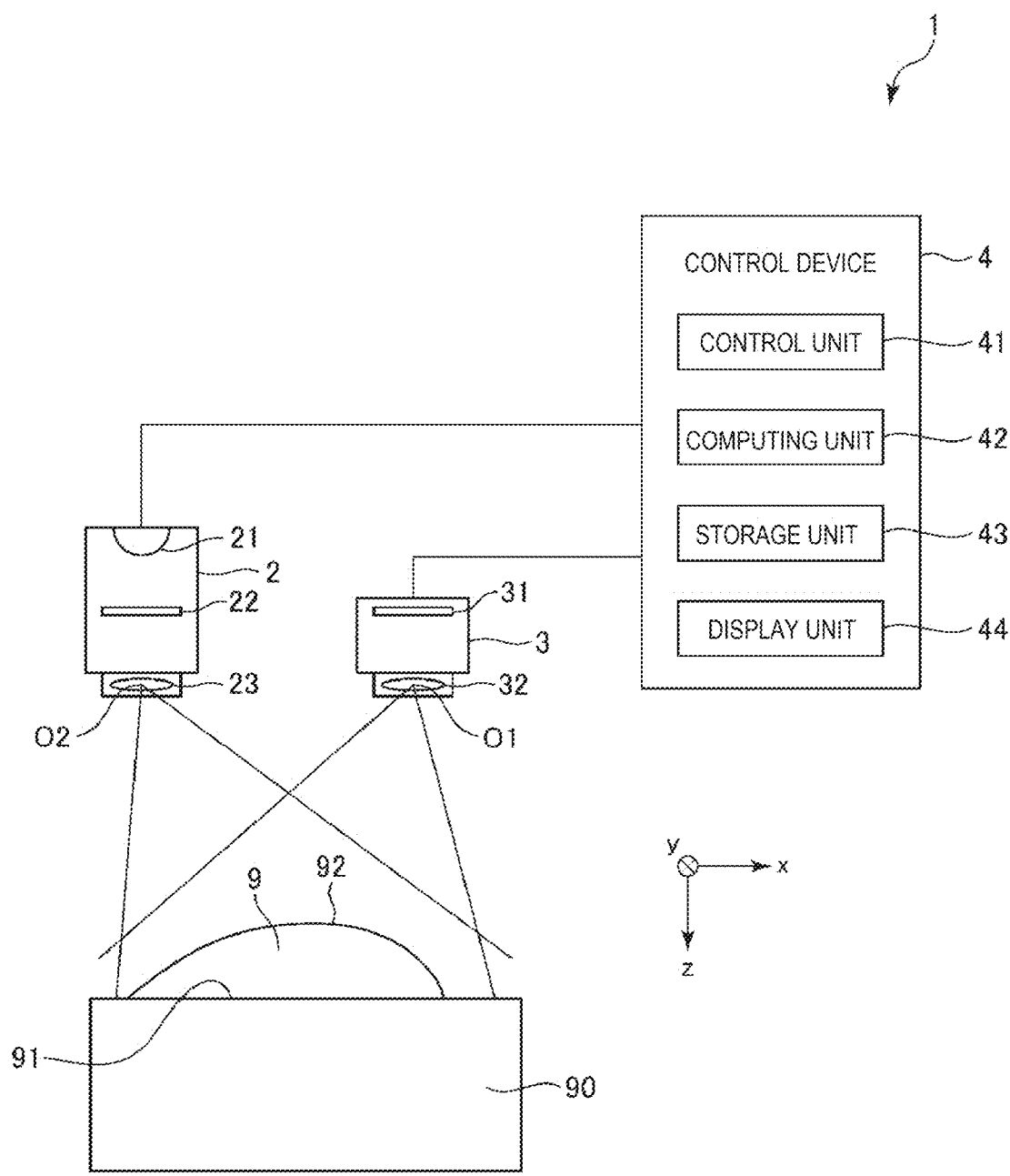
FIG. 1 is a schematic view of a three-dimensional shape measuring device according to a first embodiment.

FIG. 1 is a schematic view of the three-dimensional shape measuring device according to the first embodiment. In FIG. 1, an x-axis, a y-axis, and a z-axis are set as three axes orthogonal to each other. Each axis is represented by an arrow. The head side of the arrow is defined as "positive side". The base side is defined as "negative side". In the description below, the negative side on the z-axis is referred to as "up" and the positive side on the z-axis is referred to as "down". A position along the z-axis is referred to as "height". A position within an x-y plane is simply referred to as "position".

A three-dimensional shape measuring device 1 shown in FIG. 1 is a device that calculates the height of a surface of an object 9 (target object) provided at a reference surface 91, that is, the height of an object surface 92, and measures the three-dimensional shape thereof. A structured light projection method is used to measure the three-dimensional shape. In the structured light projection method, structured light such as a grid pattern is projected onto the object 9 and an image of this state is picked up. Then, the picked-up image is analyzed. By performing the analysis, height information of the object surface 92 is calculated and the three-dimensional shape of the object surface 92 is thus found.

The three-dimensional shape measuring device 1 shown in FIG. 1 has a projector 2, a camera 3, and a control device 4. Also, a mounting table 90 whose top surface is the reference surface 91, and the object 9 placed at the reference surface 91, are illustrated in FIG. 1.

The projector 2 has a function of emitting at least lights of two colors, of the three primary colors of light, red (R), green (G), and blue (B), and thus projecting a desired pattern. In this specification, the "color" refers to one of the three primary colors of light. In this specification, the three primary colors of light may be referred to as "RGB" according to need.

The projector 2 shown in FIG. 1 has a light source 21, a light modulation element 22 such as a liquid crystal display element, and a lens 23. The projector 2 shown in FIG. 1 is a simplified version of the actual structure. For example, in practice, the projector 2 may differ from the structure shown in FIG. 1 in that the light modulation element 22 is separated into a plurality of light modulation elements.

In the projector 2, the light modulation element 22 spatially modulates light emitted from the light source 21 and thus forms a grid pattern. This grid pattern is projected onto the object 9 via the lens 23. The projector 2 is electrically coupled to the control device 4. This enables the control device 4 to control the color, direction, pitch and the like of the grid pattern projected from the projector 2. In the description below, a pixel of the light modulation element 22 is also referred to as "projector pixel".

The camera 3 is a three-color camera having a function of detecting the luminance of the three primary colors of light at each pixel and acquiring a two-dimensional distribution of the resulting luminance value.

The camera 3 shown in FIG. 1 has an image pickup element 31 and a lens 32. The camera 3 shown in FIG. 1 is a simplified version of the actual structure. For example, in practice, the camera 3 may differ from the structure shown in FIG. 1 in that the image pickup element 31 is separated into a plurality of image pickup elements.

In the camera 3, the image pickup element 31 picks up, via the lens 32, an image of the grid pattern projected on the object 9. The camera 3 is electrically coupled to the control device 4. The picked-up image picked up by the camera is transmitted to the control device 4 and is used for analysis. In the description below, a pixel of the image pickup element 31 is also referred to as "camera pixel".

The control device 4 has a control unit 41, a computing unit 42, a storage unit 43, and a display unit 44.

The control unit 41 controls operations such as the projection of a grid pattern and a full pattern by the projector 2 and the image pickup of the grid pattern and the full pattern by the camera 3 in such a way that these operations cooperate with each other.

The computing unit 42 analyzes the picked-up image. The computing unit 42 thus finds the phase of the grid pattern, for example, at each camera pixel, and calculates the three-dimensional shape of the object surface 92.

The storage unit 43 stores control data of the grid pattern projected by the projector 2, the picked-up image picked up by the camera 3, the result of the computation by the computing unit 42, and the like.

The display unit 44 is provided according to need and displays the picked-up image picked up by the camera 3, the result of the computation by the computing unit 42, and the like.

A part or the entirety of the control unit 41, the computing unit 42, and the storage unit 43 is formed of hardware having a processor processing information, a memory storing a program and data, and an external interface. The processor reads and executes various programs and data stored in the memory and thus implements each function.

The processor may be, for example, a CPU (central processing unit), a DSP (digital signal processor), or the like. The memory may be, for example, a volatile memory such as a RAM (random-access memory), a non-volatile memory such as a ROM (read-only memory), a removable external storage device, or the like. The external interface may be, for example, a wired LAN (local area network), a wireless LAN, or the like.

A part or the entirety of the control unit 41 and the computing unit 42 may be implemented by hardware such as an LSI (large-scale integration), an ASIC (application-specific integrated circuit), or an FPGA (field-programmable gate array).

In the three-dimensional shape measuring device 1 as described above, a grid pattern and a full pattern are simultaneously projected onto the object 9, using lights of at least two colors, as will be described in detail later. The grid pattern refers to a stripe pattern having a bright strip-like area and a dark strip-like area arranged alternately, generated by casting one of the lights of two colors. The full pattern refers to a solid pattern whose entire area is bright, generated by casting the other one of the lights of two colors.

Subsequently, an image of the grid pattern and the full pattern projected on the object 9 is picked up and a grid pattern image and a full pattern image separated for each color are thus acquired. Then, the grid pattern image and the full pattern image are analyzed to find the three-dimensional shape of the object surface 92.

In this case, as a technique for analyzing the picked-up image and finding the three-dimensional shape, various known techniques can be used. Of these, any method that can acquire the three-dimensional shape of an object from one picked-up image can be used. Such a method may be, for example, a stereo block matching method, a one-pitch phase analysis method, or the like.

Of these, the stereo block matching method is a method of picking up a stereo picked-up image and associating pixels in a plurality of images with each other to find the position of an object in a three-dimensional space. This method is described, for example, in JP-A-2001-147110.

In this embodiment, the one-pitch phase analysis method is used. The principle of the one-pitch phase analysis method is described in WO2016/001985.

In the one-pitch phase analysis method, each of the optical system of the projector 2 and the optical system of the camera 3 is parallel to the reference surface 91. Such an optical system is also referred to as Moirê topography optical system. In such an optical system, on a picked-up image acquired by the camera 3 picking up an image of a grid pattern projected on the object 9, the cycle of the grid pattern is constant regardless of the height of the object surface 92. Meanwhile, the phase of the grid pattern at camera pixels changes depending on the height of the object surface 92. Therefore, the three-dimensional shape of the object surface 92 can be found by analyzing the coordinates of each camera pixel and the phase of the grid pattern at each camera pixel, using the one-pitch phase analysis method.

The one-pitch phase analysis method can perform a phase analysis based on a luminance distribution of one grid pitch in one picked-up image. Therefore, this method is advantageous in that it can find a phase distribution even when the object 9 is moving. Meanwhile, in an analysis method that requires a plurality of picked-up images, for example, as in the phase shift method, it is difficult to perform accurate three-dimensional shape measurement on the moving object 9.

Figure 2:
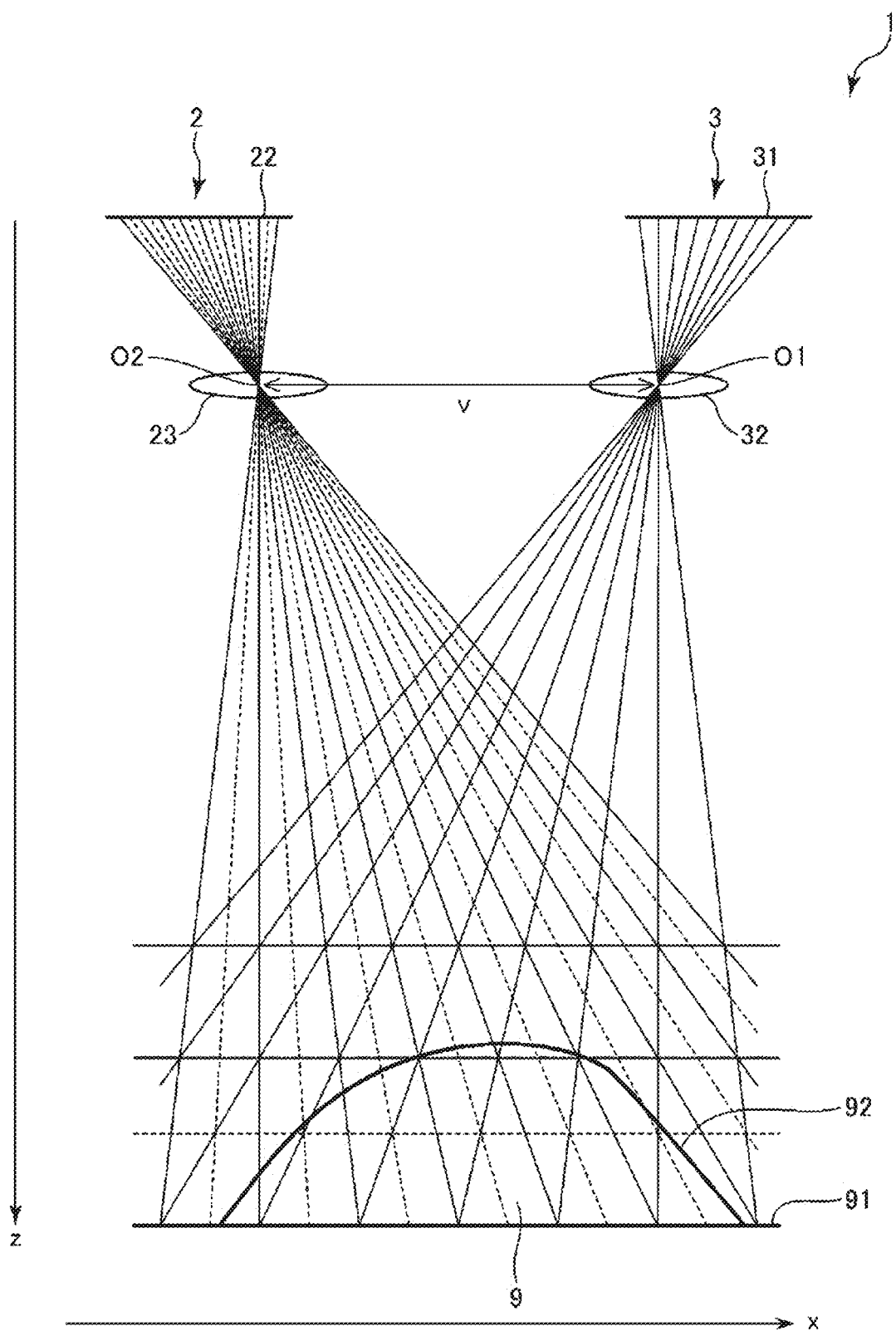
FIG. 2 is a side view schematically showing an optical system of the three-dimensional shape measuring device shown in FIG. 1.

FIG. 2 is a side view schematically showing the optical system of the three-dimensional shape measuring device 1 shown in FIG. 1.

As shown in FIG. 2, in the three-dimensional shape measuring device 1, a grid pattern is projected in such a way as to spread from the center of the lens 23 of the projector 2. Here, the center of the lens 23 is defined as a principal point O2 of the projector 2. Similarly, the image pickup range of the camera 3 is a range spreading from the center of the lens 32. Here, the center of the lens 32 is defined as a principal point O1 of the camera 3.

In FIG. 2, a grid pattern is schematically expressed by multiple straight lines. Of the straight lines expressing the grid pattern, a solid line represents, for example, the optical path of light projecting an area where the luminance of the grid pattern is high, and a dashed line represents the optical path of light projecting an area where the luminance of the grid pattern is low.

As can be seen from FIG. 2, in the optical system of the three-dimensional shape measuring device 1, one cycle of the grid pattern appears in the same size in the picked-up image by the camera 3 no matter what height the reference surface 91 or the object surface 92 is at. That is, the size of one cycle of the grid pattern in the picked-up image is defined by internal parameters of the projector 2 and the camera 3 and is not influenced by the distance to the reference surface 91 or the object surface 92. Therefore, this optical system enables the three-dimensional shape measurement on the object 9 regardless of the distance to the reference surface 91 or the object surface 92.

1.2. Measuring Method

The three-dimensional shape measuring method according to the first embodiment will now be described.

Figure 3:
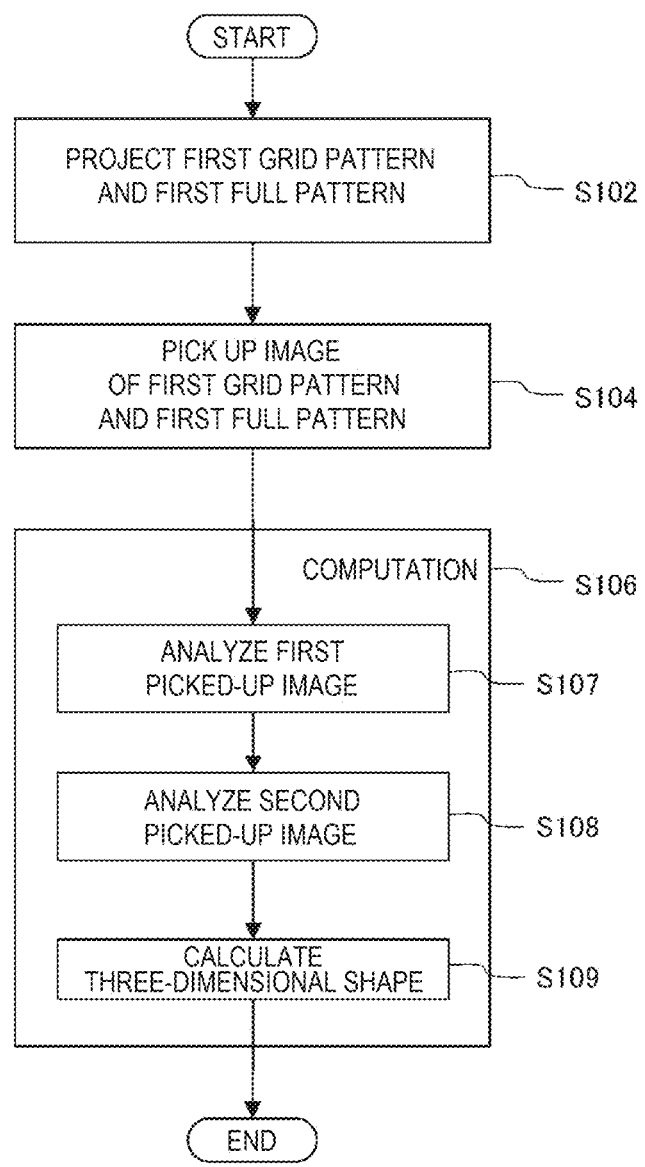
FIG. 3 is a flowchart for explaining a three-dimensional shape measuring method according to the first embodiment.

FIG. 3 is a flowchart for explaining the three-dimensional shape measuring method according to the first embodiment.

The three-dimensional shape measuring method shown in FIG. 3 includes a projection step S102, an image pickup step S104, and a computation step S106.

1.2.1. Projection Step

In the projection step S102, first, a first grid pattern and a first full pattern are prepared based on lights of two colors included in the three primary colors of light and are projected by the projector 2. In this specification, the lights of three colors included in the three primary colors of light are referred to as first light, second light, and third light.

Figure 4:
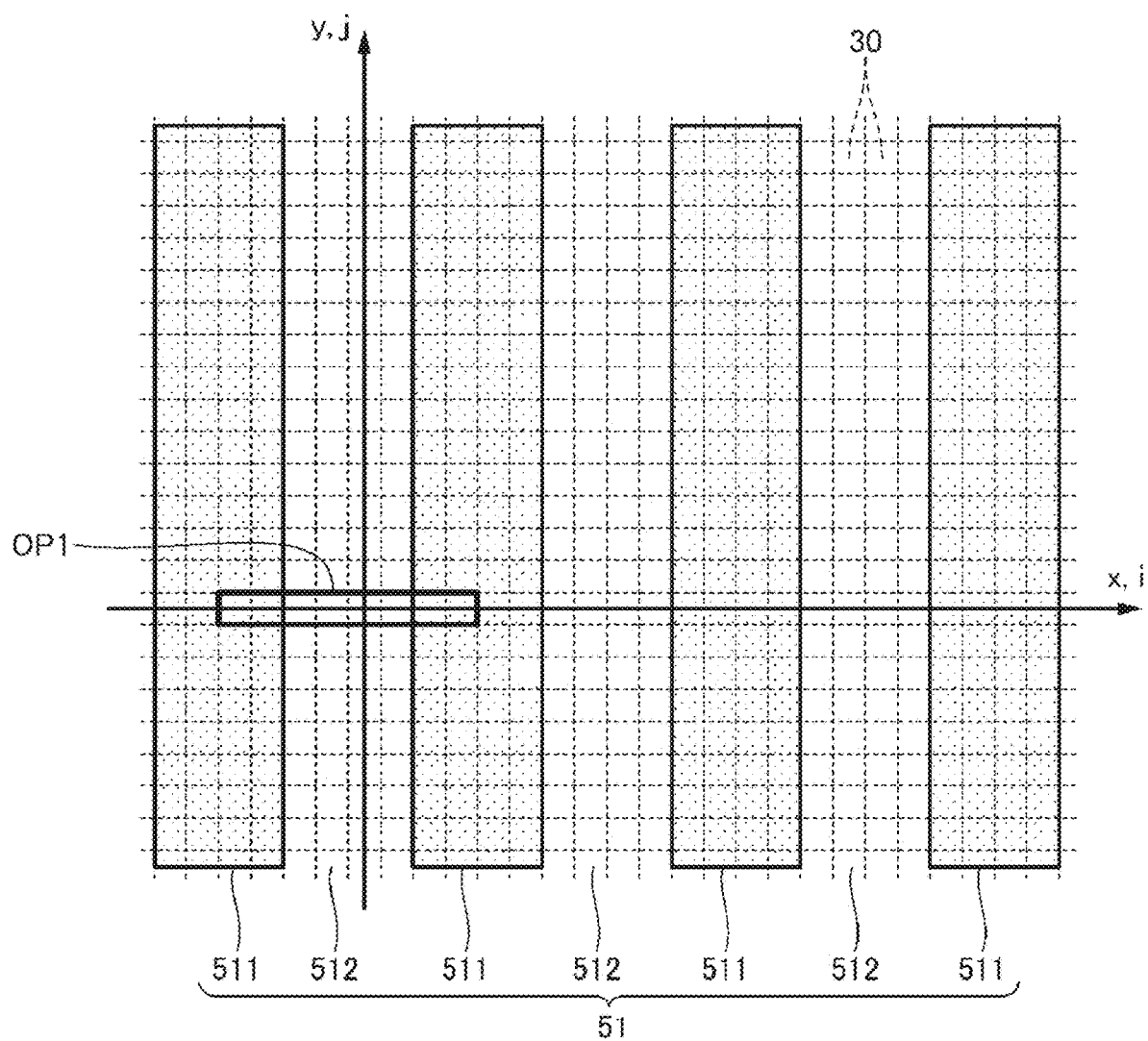
FIG. 4 shows a picked-up image acquired by picking up, by a camera, an image of a first grid pattern and a first full pattern projected by a projector, and separating a first light component.
Figure 5:
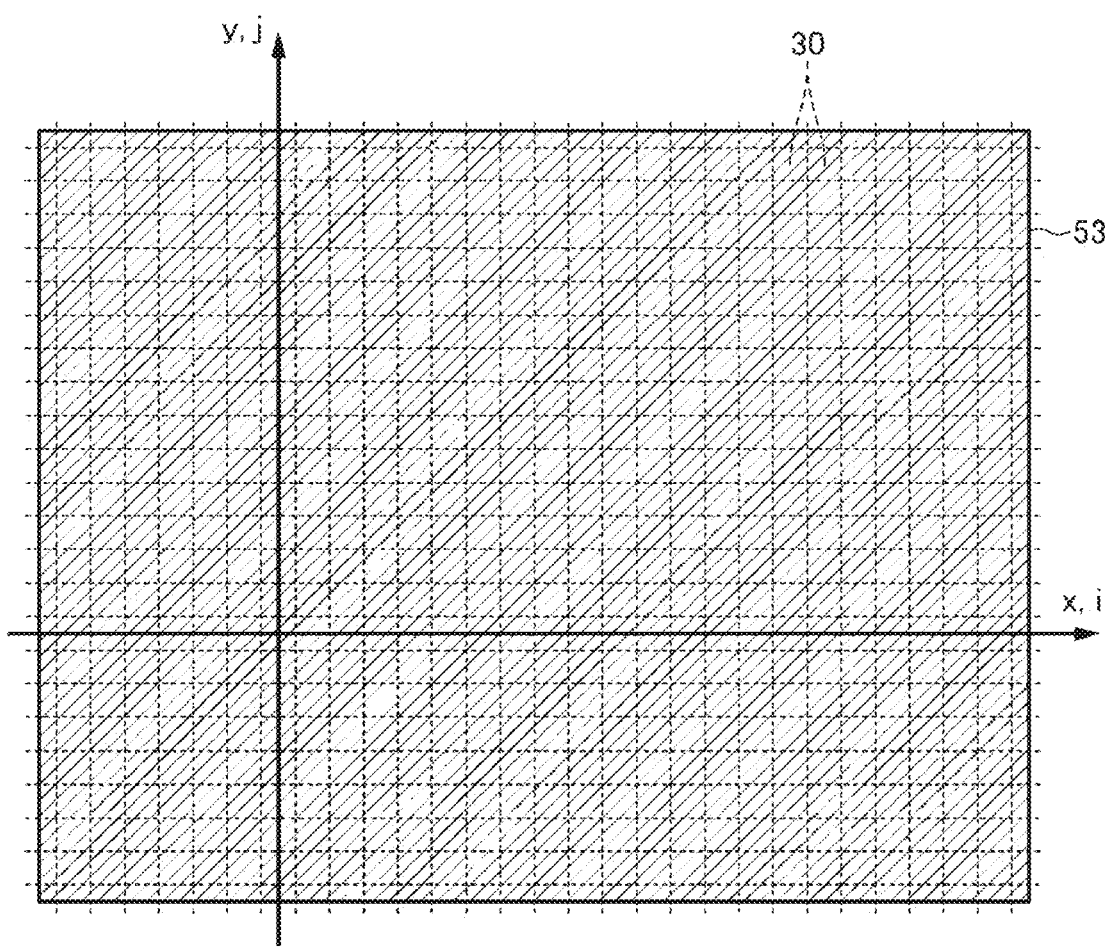
FIG. 5 shows a picked-up image acquired by picking up, by the camera, an image of the first grid pattern and the first full pattern projected by the projector, and separating a second light component.

FIG. 4 shows a picked-up image acquired by picking up, by the camera 3, an image of a first grid pattern 51 and a first full pattern 53 projected by the projector 2, and separating a first light component. FIG. 5 shows a picked-up image acquired by picking up, by the camera 3, an image of first grid pattern 51 and the first full pattern 53 projected by the projector 2, and separating a second light component. FIGS. 4 and 5 also show arrows representing the x-axis and the y-axis defining directions of the first grid pattern 51, and dashed lines representing boundaries between pixels of the camera 3. A quadrilateral surrounded by dashed lines corresponds to a camera pixel 30.

In FIGS. 4 and 5, the coordinates of the camera pixel 30 are (i, j). The optical system is set in such a way that the i-axis of the image pickup element 31 coincides with the x-axis prescribing a direction of the first grid pattern 51 and that the j-axis of the image pickup element 31 coincides with the y-axis prescribing a direction of the first grid pattern 51.

Here, the one-dimensional grid based on the first light is referred to as "first grid pattern 51" and the full pattern based on the second light is referred to as "first full pattern 53".

The first grid pattern 51 is a one-dimensional grid extending along the y-axis. Specifically, the first grid pattern 51 has a plurality of strip-like areas 511 irradiated with the first light with a relatively low luminance. The strip-like areas 511 extend parallel to the y-axis and are arranged at constant intervals along the x-axis. The first grid pattern 51 also has a plurality of strip-like areas 512 located between the areas 511 and irradiated with the first light with a relatively high luminance. The width of strip-like areas 511 and the width of the strip-like areas 512 are the same as each other.

Meanwhile, the number of projector pixels corresponding to one cycle of the first grid pattern 51 is not particularly limited. That is, the number of projector pixels corresponding to the width of the areas 511, 512 may be one, or two or more.

In this embodiment, the x-axis of the first grid pattern 51 and the i-axis of the image pickup element 31 correspond to each other and the y-axis of the first grid pattern 51 and the j-axis of the image pickup element 31 correspond to each other, as described above. However, the direction of arrangement of projector pixels of the projector 2 may be inclined to the x-axis and the y-axis.

Next, a range corresponding to one cycle of the first grid pattern 51 that is a target of analysis in the one-pitch phase analysis method will be described.

In this embodiment, the optical system formed by the projector 2 and the camera 3 is set in such a way that one cycle of the first grid pattern 51 appears on N successive pixels of the camera pixels 30. N is an integer equal to or greater than 3.

In the example shown in FIG. 4, the first grid pattern 51 has a cycle with a length corresponding to eight successive camera pixels 30 along the x-axis. Therefore, in the example shown in FIG. 4, the optical system is set in such a way that eight camera pixels 30 coincide with one cycle of the first grid pattern 51. That is, in the three-dimensional shape measuring device 1, the optical system is set in such a way that one cycle of the first grid pattern 51 projected by the projector 2 has a length corresponding to an integral multiple of a camera pixel 30.

Meanwhile, the first full pattern 53 shown in FIG. 5 is generated by casting the second light to be incident on all the camera pixels 30 within a range covering at least the object 9. The first full pattern 53 may preferably be generated by casting the first light in such a way that the luminance at the respective camera pixels 30 is uniform. However, the luminance may differ among the respective camera pixels 30.

The first light and the second light are lights of at least two colors of RGB, as descried above. In the projection step S102, these lights are simultaneously cast and the first grid pattern 51 and the first full pattern 53 are thus projected simultaneously.

The first light and the second light are lights of two colors of the three primary colors of light. Therefore, even when these lights are cast as superimposed on each other, the camera 3, which is a three-color camera, can separate these lights. This enables high-speed measurement even when using lights of two colors.

For such reasons, the projector 2 may preferably be a three-color separation projector. The three-color separation projector can separately emit lights of three colors at all the projector pixels and therefore has the function of simultaneously projecting the first grid pattern 51 based on the first light and the first full pattern 53 based on the second light. Thus, when the camera 3 simultaneously acquires a picked-up image based on the first light and a picked-up image based on the second light and the control device 4 analyzes the two picked-up images, separate information can be acquired from the two picked-up images.

As the three-color separation projector, particularly a three-panel projector may be preferably used. The three-panel projector has three light modulation elements corresponding to lights of three colors, respectively. Therefore, the lights of three colors can be separately modulated at all the projector pixels and can be cast with high position accuracy.

Specifically, as the three-panel projector, for example, a transmission-type 3LCD system, a reflection-type 3LCD system, a three-chip DLP system or the like may be employed. The transmission-type 3LCD system uses three transmission-type LCD elements. The reflection-type 3LCD system uses three reflection-type LCD elements. LCD refers to liquid crystal display. The three-chip DLP system uses an optical system that can scan with three lights separately, using three DMDs. DLP refers to digital light processing. DMD refers to digital micromirror device.

In the projector 2, lights of three colors are separately cast with respect to all the projector pixels, as described above. However, when a pixel group formed of a plurality of projector pixels can be regarded as one projector pixel, a single light modulation element 22 may be employed. In this case, measurement can be performed though the resulting measurement accuracy for three-dimensional shape is lower.

1.2.2. Image Pickup Step

In the image pickup step S104, the camera 3 picks up an image of the first grid pattern 51 and the first full pattern 53 projected on the object 9. A first picked-up image and a second picked-up image acquired by the image pickup are transmitted from the camera 3 to the computing unit 42.

The camera 3 is a three-color camera having the function of acquiring the first picked-up image and the second picked-up image separately and simultaneously, as described above. Therefore, even when the first grid pattern 51 and the first full pattern 53 are simultaneously projected, image data of these patterns that are separated from each other can be acquired. Thus, based on each of the first picked-up image and the second picked-up image, an analysis can be performed in the step described below.

For such reasons, the camera 3 may preferably have a three-panel image pickup element 31. The three-panel image pickup element 31 corresponds to each of the first light, the second light, and the third light. Therefore, a luminance value can be acquired separately for the first light, the second light, and the third light with high position accuracy at all the image pickup pixels.

A specific example of the three-panel image pickup element 31 may be, a 3CMOS system, a 3CCD system, a vertical color separation system or the like. The 3CMOS system uses three CMOS sensors. CMOS refers to complementary metal oxide semiconductor. The 3CCD system uses three CCD sensors. CCD refers to charge-coupled device.

The vertical color separation system uses an image pickup element having three light receiving layers stacked on each other. A specific example is Foveon (trademark registered).

In the camera 3, a luminance value is acquired separately for each of lights of three colors at all the camera pixels, as described above. However, when a pixel group formed of a plurality of camera pixels can be regarded as one camera pixel, a single image pickup element 31 may be employed. In this case, measurement can be performed though the resulting measurement accuracy for three-dimensional shape is lower.

Meanwhile, in this embodiment, before the foregoing projection step S102, steps similar to the projection step S102 and the image pickup step S104 are performed on the reference surface 91 where the object 9 is not arranged. In this way, a picked-up image of the reference surface 91 is transmitted to the computing unit 42 and the picked-up image or the result of computation is stored in the storage unit 43.

1.2.3. Computation Step

The computation step S106 further includes a first picked-up image analysis step S107, a second picked-up image analysis step S108, and a shape calculation step S109.

1.2.3.1. First Picked-Up Image Analysis Step

In the first picked-up image analysis step S107, first, the computing unit 42 performs a phase analysis on the first picked-up image. In this embodiment, the computing unit 42 performs the phase analysis, using a known one-pitch phase analysis (OPPA) method.

Specifically, first, a luminance value corresponding to one cycle of the first grid pattern 51 is extracted from the first picked-up image, which is a picked-up image of the first grid pattern 51.

In FIG. 4, as an example, attention is focused on eight successive pixels along the x-axis including the origin on the x-axis and the y-axis. These eight pixels are referred to as "one-pitch grid OP1". This one-pitch grid OP1 is equivalent to the foregoing range corresponding to one cycle with respect to the first grid pattern 51.

In the one-pitch phase analysis method, a phase analysis is performed sequentially while the set of luminance value data acquired at each camera pixel 30 in the one-pitch grid OP1 is shifted by one camera pixel each time along the x-axis. When all the shifting along the x-axis is finished, a phase analysis is then performed sequentially while the set of luminance value data acquired at each camera pixel 30 in the one-pitch grid OP1 is shifted by one camera pixel each time along the y-axis.

The order of these processes is not limited to the above and may be changed. In this way, phase information can be acquired at all the camera pixels 30.

The phase information acquired by the phase analysis of the one-pitch grid OP1 is stored in the storage unit 43 of the control device 4, in the state of corresponding to the coordinates of one representative camera pixel in the one-pitch grid OP1.

1.2.3.2. Second Picked-Up Image Analysis Step

In the second picked-up image analysis step S108, the computing unit 42 performs object extraction processing on the second picked-up image. This object extraction processing may be, for example, extracting a difference in luminance value between the inside and the outside of the object 9 appearing in the second picked-up image, and extracting the contour of the object 9, or the like. By performing such an analysis, position information of the object 9 in the second picked-up image can be acquired. This position information is information representing the coordinates of the object 9 in the coordinate system of the image pickup element 31.

In this embodiment, the first full pattern 53 is projected in such a way that the second light is incident on all the camera pixels 30 in the range covering at least the object 9. Therefore, there is no camera pixel 30 at which luminance value data is missing, and the contour of the object 9 can thus be extracted with high accuracy.

When the object surface 92 includes, for example, an area (shaded area) that is not irradiated with the second light as the second light is blocked by the object 9 itself, this area is observed as having an extremely low luminance value. Therefore, if an extremely low luminance value can be detected, a camera pixel 30 corresponding to the shaded area can be specified based on the extremely low luminance value.

Also, when the object surface 92 includes, for example, an area (reflection area) reflecting the cast second light toward the camera 3, this area is observed as having an extremely high luminance value. Such a luminance value tends to be observed when the object surface 92 includes a glossy area or the like. When reflection occurs, the luminance value is saturated and a correct luminance value may not be acquired. Therefore, if an extremely high luminance value can be detected, a camera pixel corresponding to the reflection area can be specified based on the extremely high luminance value.

Therefore, in the second picked-up image analysis step S108, whether the luminance value in the second picked-up image is within a predetermined range or not, is determined. When the luminance value is lower than the predetermined range or higher than the predetermined range, information about whether or not to output is stored in the storage unit 43 so as not to output height information and position information at the corresponding camera pixel, in the shape calculation step S109 described later. This can prevent the output of the height information and the position information having a large margin of error due to the extremely high luminance value or the extremely low luminance value. Eliminating in advance the height information and the position information having a large margin of error improves the usability of three-dimensional shape data and is therefore more advantageous than including such height information and position information.

In the one-pitch phase analysis method, a highly reliable luminance value needs to be provided in one cycle of the first grid pattern 51. In view of this, the accuracy of the phase analysis may drop around the camera pixel corresponding to the shaded area or the reflection area. To cope with this, in the second picked-up image analysis step S108, the information about whether or not to output may be stored in the storage unit 43 so as to prevent the output of the ultimate height information, not only at the camera pixel corresponding to the shaded area or the reflection area but also at peripheral camera pixels pixel in a range corresponding to at least one cycle of the grid pattern. This can also prevent the output of the height information and the position information at the peripheral camera pixels that are indirectly affected by the shaded area or the reflection area.

Before the object extraction processing, image processing may be performed on the second picked-up image. The image processing may be, for example, binarization processing, filter processing, noise elimination processing or the like.

1.2.3.3. Shape Calculation Step

Next, the computing unit 42 compares the phase information about the object surface 92 with the phase information about the reference surface 91 and finds a phase difference. Based on this phase difference, the computing unit 42 calculates height information from the reference surface 91 to the object surface 92.

Subsequently, the computing unit 42 calculates the three-dimensional shape of the object surface 92, based on this height information, and the position information extracted by the object extraction processing in the second picked-up image analysis step S108.

As described above, the three-dimensional shape measuring method according to this embodiment includes the projection step S102, the image pickup step S104, and the computation step S106. In the projection step S102, the first grid pattern 51 based on the first light and the first full pattern 53 based on the second light are projected onto the object 9 (target object), the first light and the second light being lights of two colors included in the three primary colors of light. In the image pickup step S104, the camera 3 (three-color camera) picks up an image of the first grid pattern 51 and the first full pattern 53 projected on the object 9 and thus acquires the first picked-up image based on the first light and the second picked-up image based on the second light. In the computation step S106, the height information of the object 9 is thus calculated, using the first picked-up image, and the position information of the object 9 is calculated, using the second picked-up image.

Such a configuration enables simultaneous acquisition of the first picked-up image and the second picked-up image even when the first grid pattern 51 and the first full pattern 53 are simultaneously cast. Therefore, the height information and the position information of the object 9 can be acquired simultaneously and in a short time. Thus, the three-dimensional shape of the object 9 can be measured accurately and at high speed.

The color of the first light and the color of the second light used in this method are suitably selected according to the color of the object 9. For example, before the three-dimensional shape measuring method is performed, the three-dimensional shape of an object whose shape is known is measured in advance with the color of light sequentially changed to RGB. Then, the color resulting in the highest measurement accuracy may be used as the color of light suitable for the object color.

FIG. 6 is a table showing a combination example of an object color and RGB allocated to the first light, the second light, and the third light, in the first embodiment. The table in FIG. 6 shows four combination examples in total. However, these combinations are not limiting.

A combination example 1 shown in FIG. 6 is an example where the object color is red. In this example, red light (R) is used as the first light for projecting the first grid pattern 51, and green light (G) is used as the second light for projecting the first full pattern 53. When the object color is red, the object surface 92 tends to have a high reflectance to red light and a low reflectance to blue light having the most distant wavelength from red light. Therefore, in the combination example 1, by using red light as the first light, the first picked-up image with a sufficient luminance can be picked up and the accuracy of the height information is high. Also, by using green light as the second light, the second picked-up image with a sufficient luminance second only to red light can be picked up and the accuracy of the position information can be secured.

A combination example 2 shown in FIG. 6 is an example where the object color is blue. In this example, blue light (B) is used as the first light and green light (G) is used as the second light. When the object color is blue, as in the case of red light, the object surface 92 tends to have a high reflectance to blue light and a low reflectance to red light having the most distant wavelength from blue light. Therefore, in the combination example 2, by using blue light as the first light, the first picked-up image with a sufficient luminance can be picked up and the accuracy of the height information is high. Also, by using green light as the second light, the second picked-up image with a sufficient luminance second only to blue light can be picked up and the accuracy of the position information can be secured.

A combination example 3 shown in FIG. 6 is an example where the object color is green. In this example, green light (G) is used as the first light and blue light (B) is used as the second light. When the object color is green, again, the object surface 92 tends to have a high reflectance to green light. Therefore, in the combination example 3, by using green light as the first light, the first picked-up image with a sufficient luminance can be picked up and the accuracy of the height information is high. As the second light, red light may be selected instead of blue light.

A combination example 4 shown in FIG. 6 is an example where the object color is white. In this example, green light (G) is used as the first light for projecting the first grid pattern 51, and red light (R) is used as the second light for projecting the first full pattern 53. When the object color is white, the object surface 92 has a high reflectance to all of RGB. Therefore, for example, when green light is selected as the first light, red light may preferably be selected as the second light. Thus, the first picked-up image and the second picked-up image with a sufficient luminance can be picked up and the accuracy of the height information and the position information is high. As the second light, blue light may be selected instead of red light.

As described above, in this embodiment, the combination of the first light and the second light can be changed according to the object color. Therefore, the luminance of the first picked-up image and the second picked-up image can be secured regardless of the object color. Thus, the ratio of the noise component to the signal component can be reduced and therefore the accuracy of the height information and the position information can be improved further.

Particularly a combination in which green light is selected as the second light when the first light is red light or blue light is employed as a preferable example. Generally, according to the spectral reflectance characteristics of an object, for example, an object having a high reflectance to red light tends to have a low reflectance to blue light having the most distant wavelength from red light. Therefore, when red light is used as the first light, using green light as the second light can increase the probability of being able to increase the luminance of the first picked-up image and to secure the luminance of the second picked-up image.

As described above, the three-dimensional shape measuring device 1 according to this embodiment has the projector 2, the camera 3, and the computing unit 42. The projector 2 projects the first grid pattern 51 based on the first light and the first full pattern 53 based on the second light onto the object 9 (target object). The camera 3 picks up an image of the first grid pattern 51 and the first full pattern 53 projected on the object 9 and thus acquires the first picked-up image based on the first light and the second picked-up image based on the second light. The computing unit 42 calculates the height information of the object 9, using the first picked-up image, and calculates the position information of the object 9, using the second picked-up image.

Such a configuration enables simultaneous acquisition of the first picked-up image and the second picked-up image even when the first grid pattern 51 and the first full pattern 53 are simultaneously cast. Therefore, the height information and the position information of the object 9 can be acquired simultaneously and in a short time. Thus, the three-dimensional shape of the object 9 can be measured accurately and at high speed.

2. Second Embodiment

A three-dimensional shape measuring method according to a second embodiment will now be described.

Figure 7:
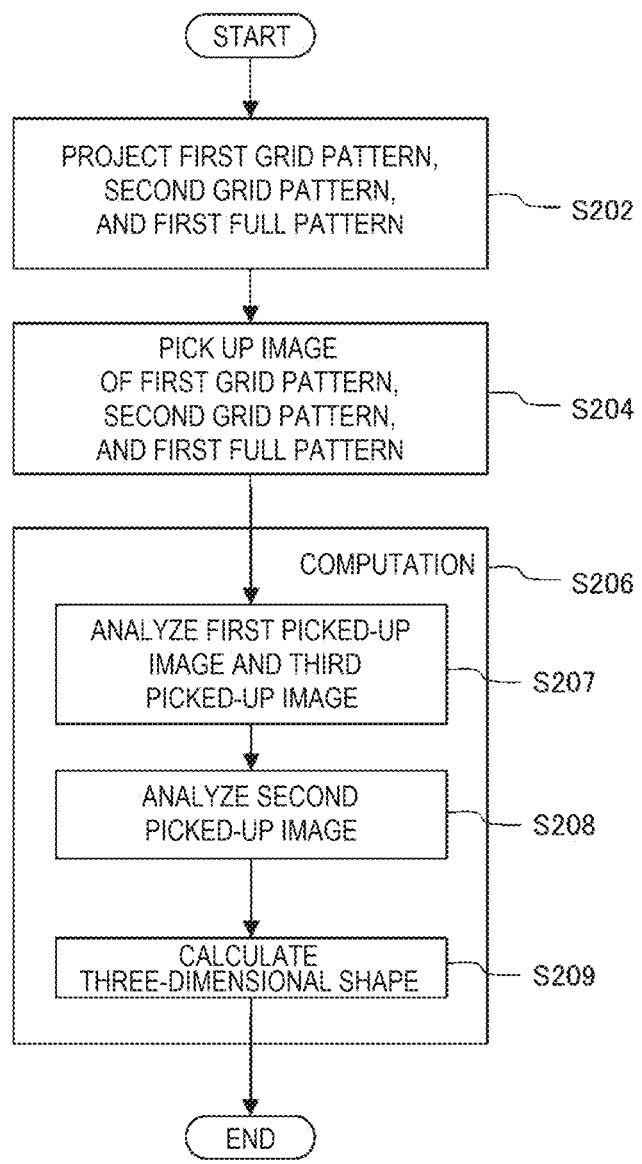
FIG. 7 is a flowchart for explaining a three-dimensional shape measuring method according to a second embodiment.

FIG. 7 is a flowchart for explaining the three-dimensional shape measuring method according to the second embodiment. FIG. 8 is a table showing a combination example of an object color and RGB allocated to the first light, the second light, and the third light, in the second embodiment.

The second embodiment is described below. In the description below, the difference from the first embodiment is mainly described and the description of similar matters is omitted. In FIGS. 7 and 8, components similar to those in the first embodiment are denoted by the same reference signs.

The second embodiment is similar to the first embodiment, except for using a third light for projecting a second grid pattern 52 in addition to the first light and the second light.

The three-dimensional shape measuring method according to this embodiment includes a projection step S202, an image pickup step S204, and a computation step S206, as shown in FIG. 7. The computation step S206 includes a first picked-up image analysis step S207, a second picked-up image analysis step S208, and a shape calculation step S209.

In the projection step S202, as in the projection step S102 according to the first embodiment, the first grid pattern 51 and the first full pattern 53 are projected. In addition to this, in the projection step S202, the second grid pattern 52 shown in FIG. 8 is projected. The second grid pattern 52 may be the same pattern as the first grid pattern 51 or a different pattern from the first grid pattern 51. In the latter case, the direction, grid pitch and the like of second grid pattern 52 can be made different from those of the first grid pattern 51.

The first light, the second light, and the third light are lights of the three primary colors of light. Even when these lights are cast as superimposed on each other, the camera 3 can acquire picked-up images of these lights that are separated from each other. Therefore, the first grid pattern 51, the second grid pattern 52, and the first full pattern 53 can be simultaneously projected.

Next, in the image pickup step S204, the camera 3 picks up an image of the second grid pattern 52 projected on the object 9 in addition to the first grid pattern 51 and the first full pattern 53 projected on the object 9.

The camera 3 has the function of acquiring a first picked-up image based on the first light, a second picked-up image based on the second light, and a third picked-up image based on the third light, separately from each other.

Next, in the first picked-up image analysis step S207 included in the computation step S206, a phase analysis is performed, as in the first picked-up image analysis step S107 according to the first embodiment. In the second embodiment, not only a phase analysis on the first picked-up image but also a phase analysis on the third picked-up image is performed. Thus, phase information from the first picked-up image and phase information from the third picked-up image can be acquired. The two picked-up images thus acquired are combined together to form one composite picked-up image and subsequently phase information is acquired from this composite picked-up image. Thus, phase information with higher accuracy can be acquired. Then, in the step described below, height information can be calculated based on this phase information.

Next, in the second picked-up image analysis step S208, the position information of the object 9 is acquired from the second picked-up image, as in the second picked-up image analysis step S108 according to the first embodiment.

Next, in the shape calculation step S209, the three-dimensional shape is calculated, as in the shape calculation step S109 according to the first embodiment.

The second embodiment, as described above, can achieve effects similar to those of the first embodiment.

The foregoing way of using two picked-up images is not limiting. For example, one piece of phase information may be acquired from two picked-up images and subsequently the height information may be calculated in the step described below. Alternatively, phase information and height information may be calculated from each of two picked-up images and subsequently one piece of height information may be calculated based on the two pieces of height information.

The way of allocating RGB to the first light, the second light, and the third light is not particularly limited in this embodiment, either.

FIG. 8 is a table showing a combination example of an object color and RGB allocated to the first light, the second light, and the third light, in the second embodiment. The table in FIG. 8 shows four combination examples in total. However, these combinations are not limiting.

A combination example 5 shown in FIG. 8 is an example where the object color is red. In this example, red light (R) is used as the first light for projecting the first grid pattern 51. Blue light (B) is used as the second light for projecting the second grid pattern 52. Green light (G) is used as the third light for projecting the first full pattern 53.

A combination example 6 shown in FIG. 8 is an example where the object color is blue. In this example, blue light (B) is used as the first light, red light (R) is used as the second light, and green light (G) is used as the third light.

A combination example 7 shown in FIG. 8 is an example where the object color is green. In this example, green light (G) is used as the first light, red light (R) is used as the second light, and blue light (B) is used as the third light.

A combination example 8 shown in FIG. 8 is an example where the object color is white. In this example, green light (G) is used as the first light, blue light (B) is used as the second light, and red light (R) is used as the third light.

In this embodiment, as described above, in the projection step S202, the second grid pattern 52 based on the third light in addition to the first grid pattern 51 and the first full pattern 53 is projected onto the object 9 (target object), the third light being the light other than the first light and the second light, of the lights of three colors included in the three primary colors of light. In the image pickup step S204, the camera 3 (three-color camera) picks up an image of the first grid pattern 51, the second grid pattern 52, and the first full pattern 53 projected on the object 9 and thus acquires the first picked-up image, the second picked-up image, and the third picked-up image. In the computation step S206, the height information of the object 9 is calculated using the first picked-up image and the third picked-up image, and the position information of the object 9 is calculated using the second picked-up image.

In such a configuration, the height information of the object 9 can be calculated, based on the first picked-up image acquired by picking up an image of the first grid pattern 51 and the third picked-up image acquired by picking up an image of the second grid pattern 52. Thus, the three-dimensional shape can be calculated with higher accuracy.

3. Third Embodiment

A three-dimensional shape measuring method according to a third embodiment will now be described.

Figure 9:
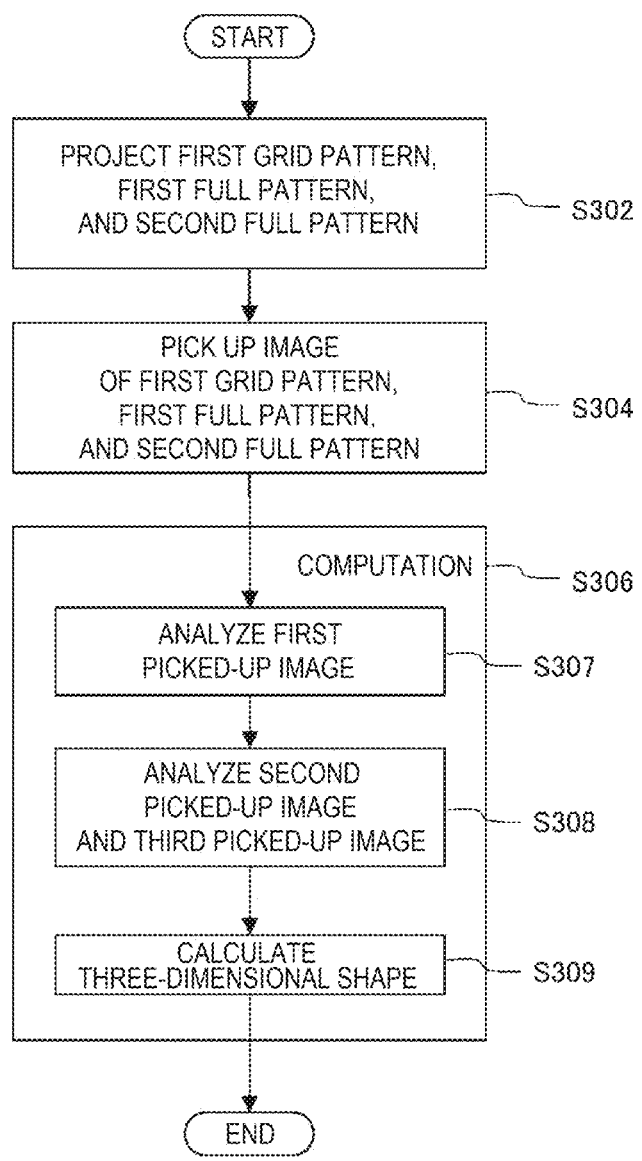
FIG. 9 is a flowchart for explaining a three-dimensional shape measuring method according to a third embodiment.

FIG. 9 is a flowchart for explaining the three-dimensional shape measuring method according to the third embodiment. FIG. 10 is a table showing a combination example of an object color and RGB allocated to the first light, the second light, and the third light, in the third embodiment.

The third embodiment is described below. In the description below, the difference from the first embodiment is mainly described and the description of similar matters is omitted. In FIGS. 9 and 10, components similar to those in the first embodiment are denoted by the same reference signs.

The third embodiment is similar to the first embodiment, except for using a third light for projecting a second full pattern 54 in addition to the first light and the second light.

The three-dimensional shape measuring method according to this embodiment includes a projection step S302, an image pickup step S304, and a computation step S306, as shown in FIG. 9. The computation step S306 includes a first picked-up image analysis step S307, a second picked-up image analysis step S308, and a shape calculation step S309.

In the projection step S302, as in the projection step S102 according to the first embodiment, the first grid pattern 51 and the first full pattern 53 are projected. In addition to this, in the projection step S302, the second full pattern 54 shown in FIG. 10 is projected. The second full pattern 54 is the same pattern as the first full pattern 53.

The first light, the second light, and the third light are lights of the three primary colors of light. Even when these lights are cast as superimposed on each other, the camera 3 can acquire picked-up images of these lights that are separated from each other. Therefore, the first grid pattern 51, the first full pattern 53, and the second full pattern 54 can be simultaneously projected.

Next, in the image pickup step S304, the camera 3 picks up an image of the second full pattern 54 projected on the object 9 in addition to the first grid pattern 51 and the first full pattern 53 projected on the object 9.

The camera 3 has the function of acquiring a first picked-up image based on the first light, a second picked-up image based on the second light, and a third picked-up image based on the third light, separately from each other.

Next, in the first picked-up image analysis step S307 included in the computation step S306, a phase analysis is performed, as in the first picked-up image analysis step S107 according to the first embodiment. Then, in the step described below, height information can be calculated based on this phase information.

In the second picked-up image analysis step S308, the position information of the object 9 is acquired from the second picked-up image, as in the second picked-up image analysis step S108 according to the first embodiment. In the third embodiment, the position information of the object 9 is also acquired from the third picked-up image. Thus, the position information from the second picked-up image and the position information from the third picked-up image can be acquired. The two picked-up images thus acquired are combined together to form one composite picked-up image and subsequently phase information is acquired from this composite picked-up image. Thus, phase information with higher accuracy can be acquired.

In the shape calculation step S309, the three-dimensional shape is calculated, as in the shape calculation step S109 according to the first embodiment.

The third embodiment, as described above, can achieve effects similar to those of the first embodiment.

The foregoing way of using two picked-up images is not limiting. For example, position information may be calculated from each of two picked-up images and subsequently one piece of position information may be found from the two pieces of position information. To find one piece of position information from the two pieces of position information, for example, the two pieces of position information may be averaged. Also, the difference between the two picked-up images may be found and a noise or the like may be detected based on the size of the difference.

The way of allocating RGB to the first light, the second light, and the third light is not particularly limited in this embodiment, either.

FIG. 10 is a table showing a combination example of an object color and RGB allocated to the first light, the second light, and the third light, in the third embodiment. The table in FIG. 10 shows four combination examples in total. However, these combinations are not limiting.

A combination example 9 shown in FIG. 10 is an example where the object color is red. In this example, red light (R) is used as the first light for projecting the first grid pattern 51. Green light (G) is used as the second light for projecting the first full pattern 53. Blue light (B) is used as the third light for projecting the second full pattern 54.

A combination example 10 shown in FIG. 10 is an example where the object color is blue. In this example, blue light (B) is used as the first light, green light (G) is used as the second light, and red light (R) is used as the third light.

A combination example 11 shown in FIG. 10 is an example where the object color is green. In this example, green light (G) is used as the first light, blue light (B) is used as the second light, and red light (R) is used as the third light.

A combination example 12 shown in FIG. 10 is an example where the object color is white. In this example, green light (G) is used as the first light, red light (R) is used as the second light, and blue light (B) is used as the third light.

In this embodiment, as described above, in the projection step S302, the second full pattern 54 based on the third light in addition to the first grid pattern 51 and the first full pattern 53 is projected onto the object 9 (target object), the third light being the light other than the first light and the second light, of the lights of three colors included in the three primary colors of light. In the image pickup step S304, the camera 3 (three-color camera) picks up an image of the first grid pattern 51, the first full pattern 53, and the second full pattern 54 projected on the object 9 and thus acquires the first picked-up image, the second picked-up image, and the third picked-up image. In the computation step S306, the height information of the object 9 is calculated using the first picked-up image, and the position information of the object 9 is calculated using the second picked-up image and the third picked-up image.

In such a configuration, the position information of the object 9 can be calculated, based on the first picked-up image and the third picked-up image acquired by picking up an image of the first full pattern 53 and the second full pattern 54. Thus, the three-dimensional shape can be calculated with higher accuracy.

The three-dimensional shape measuring method and the three-dimensional shape measuring device according to the present disclosure have been described, based on the illustrated embodiments. However, the three-dimensional shape measuring method according to the present disclosure is not limited to the embodiments. For example, a step having any objective may be added to the embodiments. The three-dimensional shape measuring device according to the present disclosure is not limited to the embodiments, either. For example, each component in the embodiments may be replaced by a component of any configuration having a similar function. Also, any component may be added to the embodiments.

What is claimed is:

1. A three-dimensional shape measuring method comprising:
projecting a first grid pattern based on a first light and a first full pattern based on a second light onto a target object, the first light and the second light being lights of two colors included in three primary colors of light;
picking up, by a three-color camera, an image of the first grid pattern and the first full pattern projected on the target object, and acquiring a first picked-up image based on the first light and a second picked-up image based on the second light; and
calculating height information of the target object, using the first picked-up image, and calculating position information of the target object, using the second picked-up image.

2. The three-dimensional shape measuring method according to claim 1, wherein
the first grid pattern and the first full pattern are projected by a three-color separation projector.

3. The three-dimensional shape measuring method according to claim 2, wherein
the three-color separation projector is a three-panel projector.

4. The three-dimensional shape measuring method according to claim 1, wherein
the three-color camera has a three-panel image pickup element.

5. The three-dimensional shape measuring method according to claim 1, wherein
the first light is red light or blue light, and the second light is green light.

6. The three-dimensional shape measuring method according to claim 1, further comprising:
projecting a second grid pattern based on a third light onto the target object, the third light being a light other than the first light and the second light, of lights of three colors included in the three primary colors of light;
picking up, by the three-color camera, an image of the first grid pattern, the second grid pattern, and the first full pattern projected on the target object and thus acquiring the first picked-up image, the second picked-up image, and a third picked-up image based on the third light; and
calculating the height information of the target object, using the first picked-up image and the third picked-up image, and calculating the position information of the target object, using the second picked-up image.

7. The three-dimensional shape measuring method according to claim 1, further comprising:
projecting a second full pattern based on a third light onto the target object, the third light being a light other than the first light and the second light, of lights of three colors included in the three primary colors of light;
picking up, by the three-color camera, an image of the first grid pattern, the first full pattern, and the second full pattern projected on the target object and thus acquiring the first picked-up image, the second picked-up image, and a third picked-up image based on the third light; and
calculating the height information of the target object, using the first picked-up image, and calculating the position information of the target object, using the second picked-up image and the third picked-up image.

8. A three-dimensional shape measuring device comprising:
a projector projecting a first grid pattern based on a first light and a first full pattern based on a second light onto a target object, the first light and the second light being lights of two colors included in three primary colors of light;
a three-color camera picking up an image of the first grid pattern and the first full pattern projected on the target object and acquiring a first picked-up image based on the first light and a second picked-up image based on the second light; and
a computing unit calculating height information of the target object, using the first picked-up image, and calculating position information of the target object, using the second picked-up image.

* * * * *